Sept. 8, 1931.  F. J. SPRAGUE  1,822,633
ELECTRIC TOASTER
Filed April 13, 1929   5 Sheets-Sheet 1

Sept. 8, 1931.  F. J. SPRAGUE  1,822,633
ELECTRIC TOASTER
Filed April 13, 1929  5 Sheets-Sheet 2
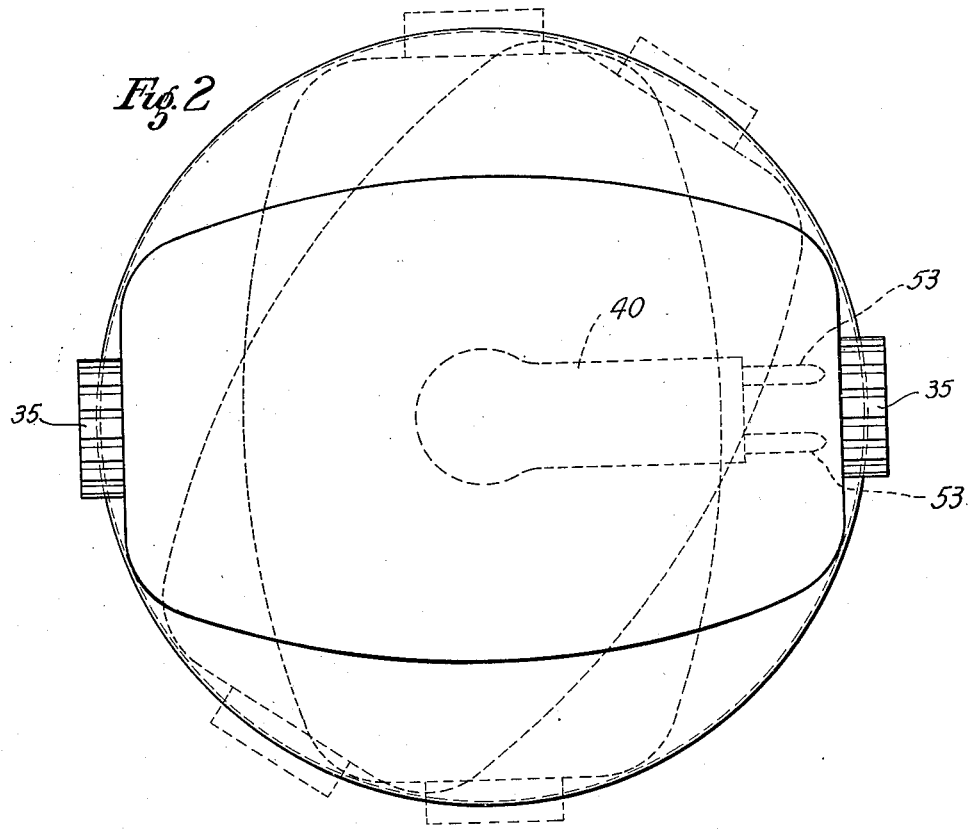
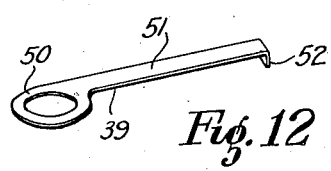
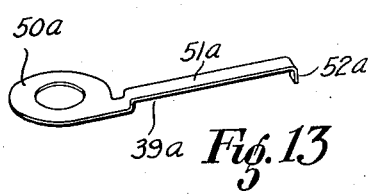
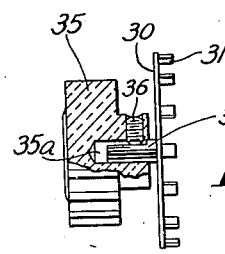

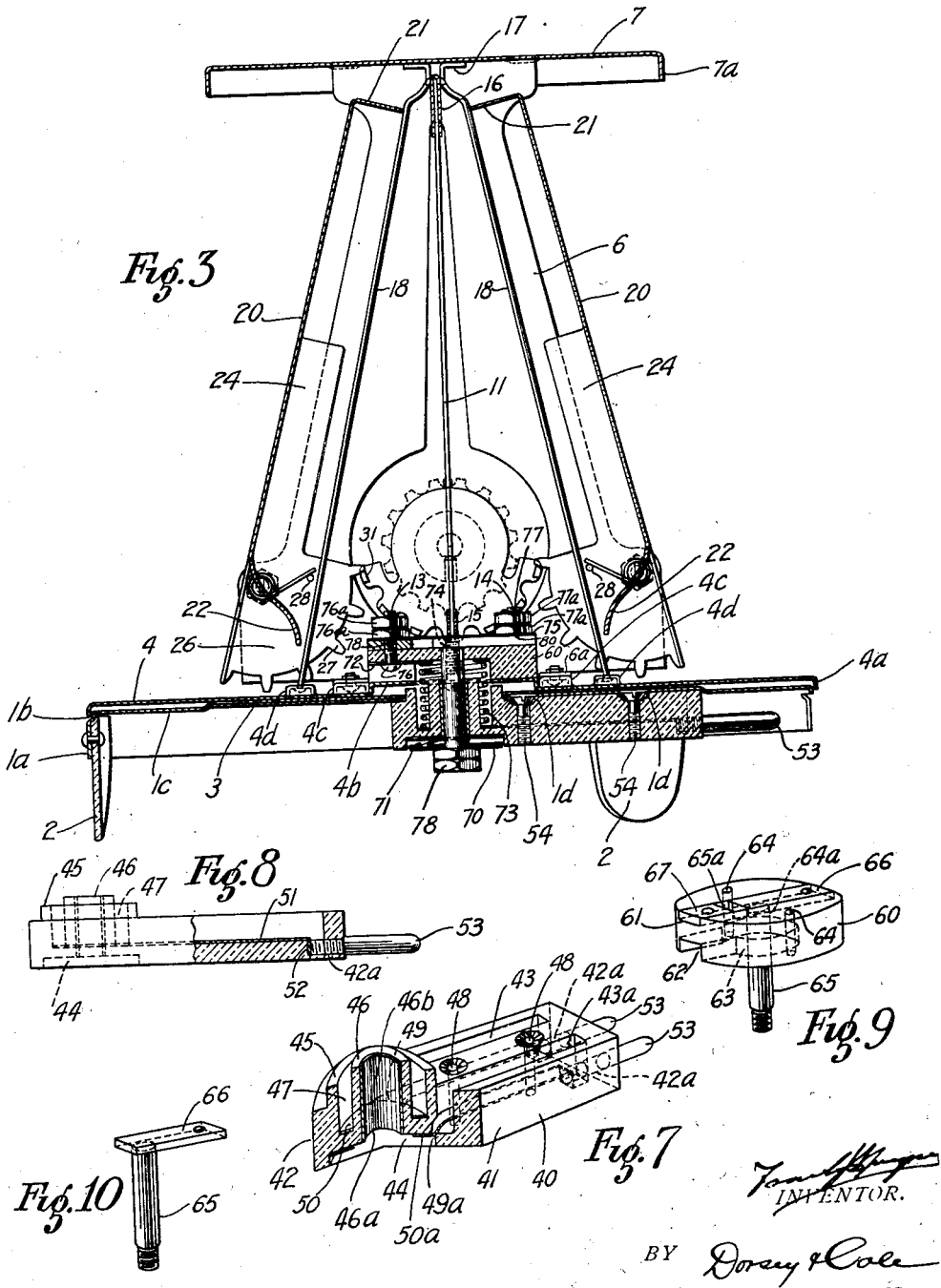

Sept. 8, 1931.  F. J. SPRAGUE  1,822,633

ELECTRIC TOASTER

Filed April 13, 1929    5 Sheets-Sheet 4

INVENTOR.

BY Dorsey & Cole
ATTORNEYS.

Sept. 8, 1931.  F. J. SPRAGUE  1,822,633
ELECTRIC TOASTER
Filed April 13, 1929  5 Sheets-Sheet 5
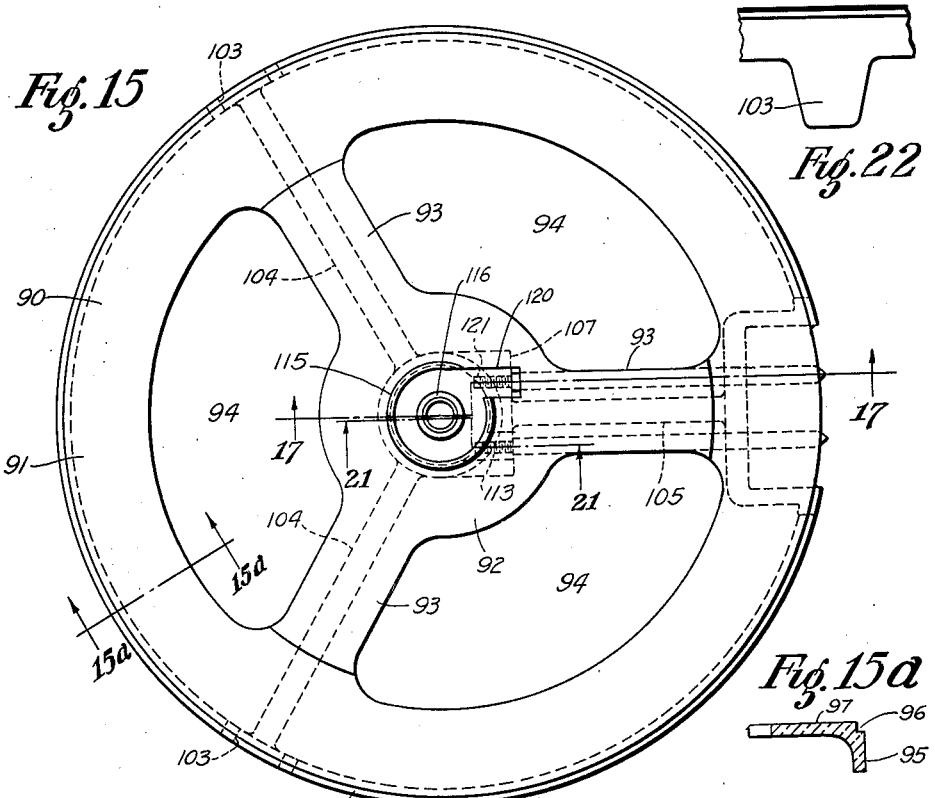
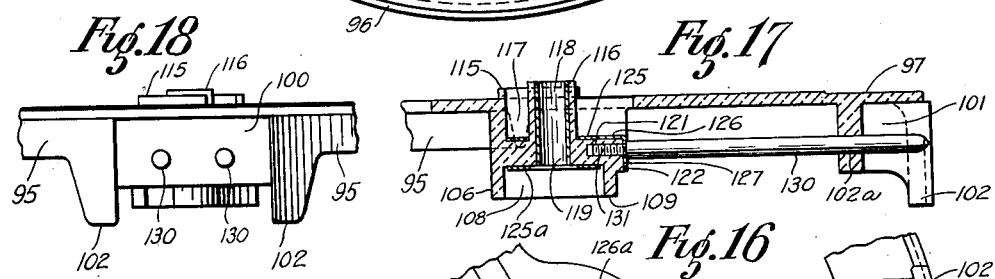
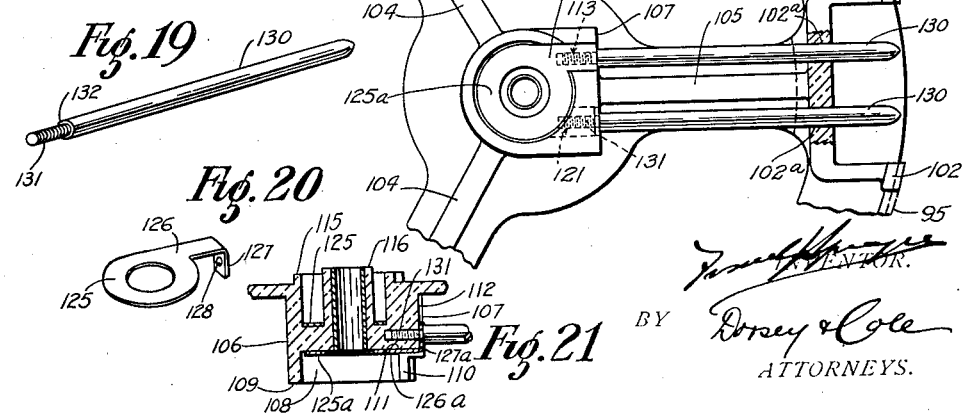

Patented Sept. 8, 1931

1,822,633

UNITED STATES PATENT OFFICE

FRANK J. SPRAGUE, OF NEW YORK, N. Y.

ELECTRIC TOASTER

Application filed April 13, 1929. Serial No. 354,811.

This invention has for its object the improvement in the construction and form of electric toasters so as to make them more convenient, efficient and accessible in use.

A toaster of novel construction has been disclosed in my U. S. Patent #1,706,259 of March 19, 1929, and the features of my present invention will be described in their application to a toaster of the type disclosed in said patent. It should be understood, however, that these features also can be applied to other types of toasters.

More specifically the object of this invention is to provide simple and convenient means to open and close hinged or otherwise supported side-openings of an electric toaster.

Another object of this invention is to provide novel electric connecting means, allowing a rotatable toast-carrying portion of the toaster to assume any desired angular position relative to a stationary base, without breaking thereby the electric circuit of the heating element.

A further object of this invention is to provide means whereby rotation of the movable part of the toaster is made easy and convenient and whereby said part is properly guided and supported by the stationary base in all of its positions.

A still further object of this invention is to so correlate the various parts of the toaster that the rotatable portion shall not extend substantially beyond the stationary base in any position it may assume.

A still further object of this invention is to provide on the toaster connecting terminals to an external source of electric supply which are protectedly located within the stationary base of the toaster.

A still further object of this invention is to provide a base of heat insulating material for more convenient handling of the toaster as well as to protect from radiated heat the furniture on which the toaster is placed.

Other objects of the invention will appear as the description proceeds.

Referring to the accompanying drawings in which corresponding parts are designated by corresponding marks of reference:

Fig. 2 is a diagrammatic top view of Fig. 1 also indicating in dotted lines the toast-carrier frame in two additional positions.

Fig. 3 is a side elevation of Fig. 1 partly in section.

Fig. 7 is a perspective view of the electric connector partly in section and with the spring contacts removed.

Fig. 8 is a side view of the electric connector, partly in section.

Fig. 9 is a perspective view of the terminal base of the heating element with the rotating shaft and contact strips.

Fig. 10 is a perspective view of the rotating shaft and its contact plate.

Fig. 11 is a top view of the lugged contact ring 26.

Fig. 12 is a perspective view of the contact strip 39.

Fig. 13 is a perspective view of the contact strip 39a.

Fig. 14 is a side view partly in section showing parts of the door opening mechanism.

Fig. 15 is a plan view of another construction of the toaster base and connector.

Fig. 15a is a section through the outside rim of the base taken on line 15a—15a of Fig. 15.

Fig. 16 is a fragmental view showing the connector and associated parts seen from the bottom.

Fig. 17 is a sectional view of the connector taken on line 17—17 of Fig. 15.

Fig. 18 is a partial front view showing the connector and the adjacent feet of the toaster.

Fig. 19 is a perspective view of one of the terminal rods 130.

Fig. 20 is a perspective view of the contact ring 125.

Fig. 21 is a fragmental sectional view of the connector taken on line 21—21 of Fig. 15.

Fig. 22 is a fragmental front view of one of the feet 103.

Figure 1:
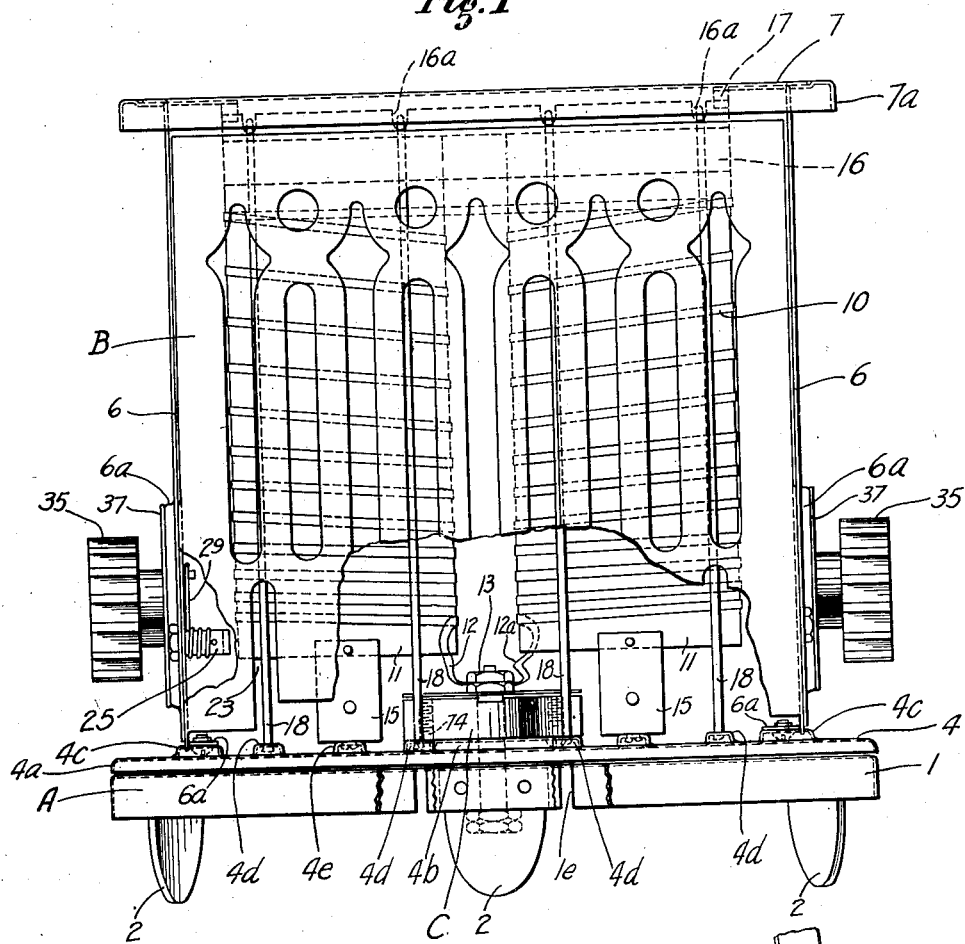
Figure 1 is a front elevation of an electric toaster embodying my invention.

Referring to Fig. 1, the toaster there illustrated is shown to comprise three main parts, a fixed base A, a rotatable portion B which comprises the toast-carriers, the heating elements and other parts later to be described and mechanical and electrical connecting means C to connect the portions A and B.

The base A consists of a circular plate 1 spun on its periphery to form a rim 1a which is slightly reset on its upper end 1b. The plate 1 is preferably depressed on its outer portion 1c and is perforated in the center. It also carries two perforated conical depressions 1d. One portion of the rim 1a is cut away to form an opening 1e (see Fig. 1).

The plate 1 is supported by feet 2 of which I have shown three and which are preferably of heat insulating material. The feet are suitably secured to the plate 1, for instance by being revited to the rim 1a.

The movable part B comprises a circular plate 4 with a downward extending narrow rim 4a which fits in the recess 1b of the baseplate 1.

The plate 4, which is preferably made as a stamping is raised in its central portion 4b and is provided with a plurality of perforated embossings 4c, 4d and 4e, function of which will later appear.

A metal washer 3 is preferably inserted between the plates 1 and 4 to reduce friction between same, when the toaster is rotated.

Carried by the plate 4 is a toast-carrier frame comprising two upwardly sloping sides 6 and a top 7 having a downwardly extending rim 7a. The sides and the top are suitably fastened together and are preferably stampings provided with perforations for the purpose of ventilation. The sides which are anchored in the embossings 4c of the plate 4 are provided at their lower part with a circular raised portion 6a perforated in the center.

Placed within the heat carrier frame is a heating element of any suitable design, here being illustrated as a resistance wire 10 wound on two separate mica plates 11—11 and having its free ends 12 and 12a connected to terminals 13—14. The mica plates 11—11 are clamped on their lower ends between metal strips 15—15 which are anchored in the embossings 4c—4c of the plate 4. On their upper ends the mica plates 11—11 are clamped between a bent metal strip 16 which is fastened at its end by means of angles 17 to the top 7 of the carrier frame.

Metal rods 18, bent in their middle portion to form an inverted V and anchored at their free end in the embossings 4d of the plate 4, serve as rests for the toast. The strip 16 is provided with notches 16a to receive the upper bent portion of the rods 18.

Figure 1A:
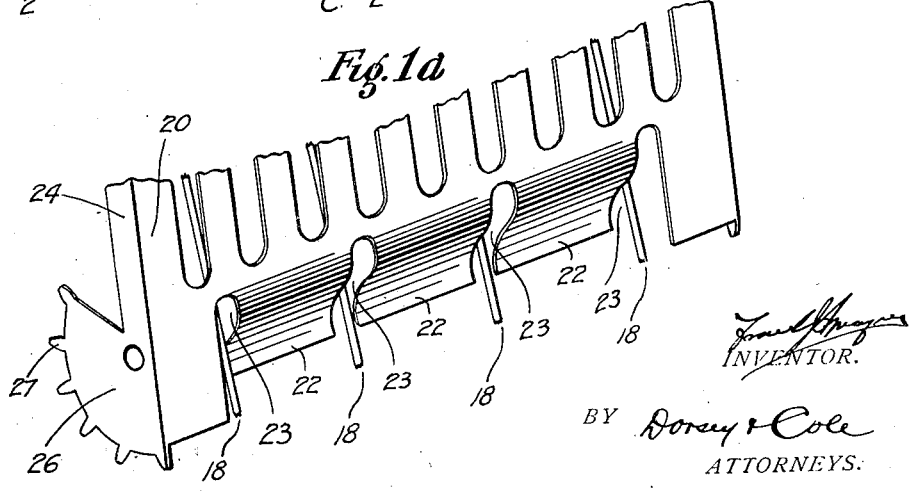
Fig. 1a is a fractional perspective view showing the lower end of the door.
Figures 4, 5:
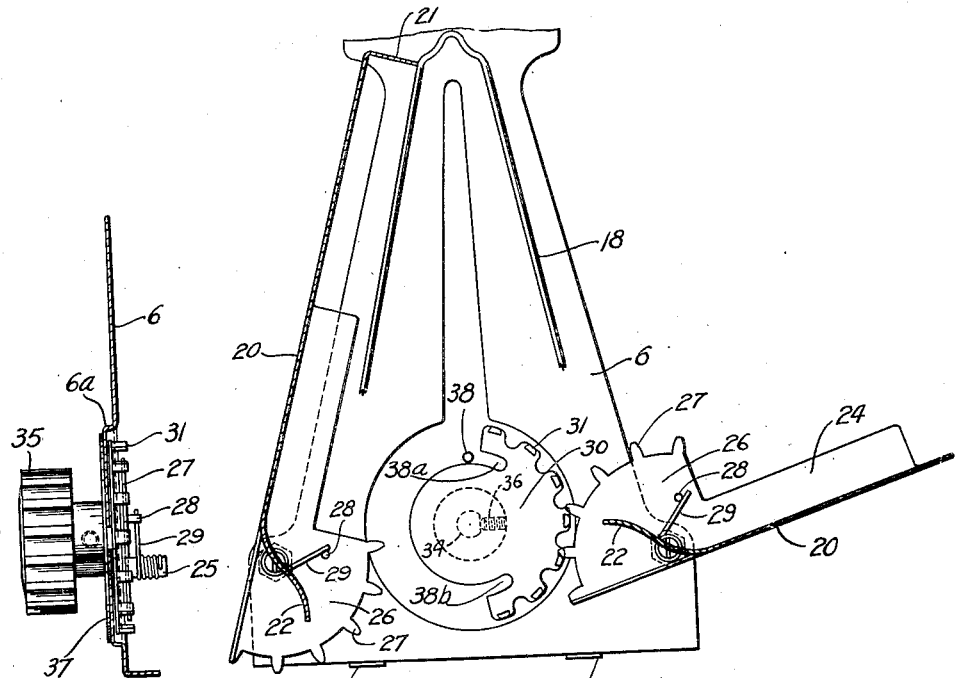
Fig. 4 is a side view showing the side-door opening mechanism of the toaster.
Fig. 5 is a fragmental side view of the moving portion of the toaster showing the right-hand side door in an open position.
Figure 6:
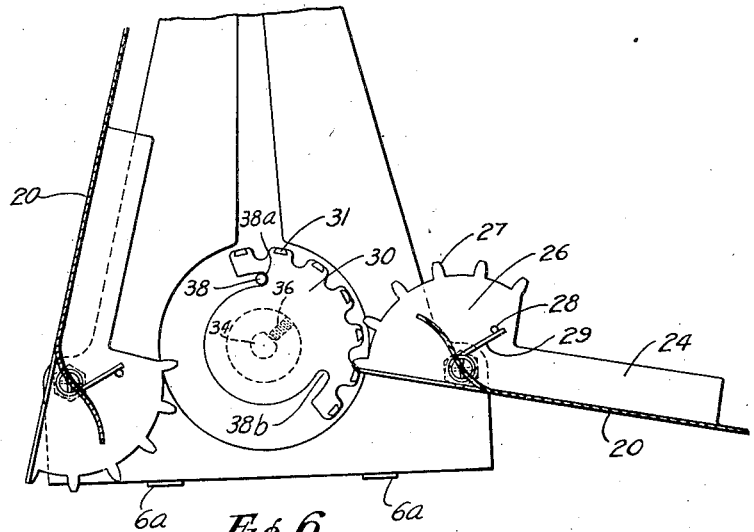
Fig. 6 is a similar view to Fig. 5, but with the right-hand door in the extreme opened position.

Hingedly supported by the sides 6 on pivots 25 thereof are perforated wings or doors 20 which are made preferably as stampings. The doors 20 are provided at their top and on their sides with rims 21 and 24, respectively, to prevent the slipping of the toast when the doors are opened. The lower end of the door 20 is provided with slots 23 to permit the wing to pass by the rods 18. The portion 22 of the door 20 which extends between the two outer slots 23 (see Fig. 1a), is bent inwardly to form a rest for the bottom of the toast, and also serves as means to slide down the toast and to reverse its position when the door is opened.

The side rim 24 forms at its lower end sectors 26 provided with teeth 27. A coiled spring 29 is fastened with one of its ends to the pivot 25 of the side and with its other end held by a stop pin 28 of the sector 26, and serves to automatically return the door after it has been opened.

For the opening of the doors there is provided on each side 6, located within the inner side of its raised portion 6a a crown sector 30, provided with teeth 31 which engage in operation the teeth 27 of one or the other sector 26. The gears 30 are actuated by means of a knurled knob 35 preferably of heat insulating material, which is provided with a bore 35a to receive a shaft 34 riveted or otherwise fastened to the gear 30 and secured to the knob 35 by means of a set screw 36. A washer 37 of heat insulating material is preferably placed between the outer face of the side portion 6a and the knob 35.

The electrical and mechanical connecting means C comprise a connector base 40 of insulating material having a longitudinal portion 41 and a substantially cylindrical portion 42. The longitudinal portion 41 is provided with two longitudinal slots 43 and 43a and with two threaded holes 42a—42a on its end face. Between the two longitudinal slots 43 and 43a it is also provided with two countersunk and threaded holes 48—48.

The cylindrical portion 42 is provided on its bottom with an annular recess 44, while on the top it forms an insulating rim 45 and a shaft bearing 46, separated by an annular bore 47, with the shaft bearing preferably slightly projecting above the rim 46. The shaft bearing is provided with a metal bushing 46a and a bore 46b. Slits 49 and 49a are provided in the base 40 to connect the annular bore 47 and the recess 44 to the slots 43 and 43a respectively.

Placed on the bottom of the annular groove 47 and extending through the slit 49 in the slot 43 is a contact strip 39 (see Figs. 8 and 12), having an annular portion 50 and a longitudinal extension 51 with a bent end 52. Placed in the annular recess 44 and extending through the slit 49a in the longitudinal slot 43a is a contact strip 39a having an annular portion 50a and an extension 51a with a bent end 52a. Plug terminals 53—53 screwed in the holes 42a are pressed against the bent portions 52 and 52a of the contact strips 50 and 50a. The connector base 40 is screwed by means of two screws 54 to the plate 1 of the base, for which purpose the previously described countersunk holes 1d of the plate 1 and the threaded and countersunk holes 48 of the connector base 40 are provided.

A contact base 60 of insulating material and having a cylindrical form (see Fig. 9), is provided on its top with a slot 61 and on its bottom with a circular cavity 63 connected to the periphery by a slot 62. The slot 61 is connected to the circular cavity 63 by means of a bore 64a.

The contact base 60 is also provided with two threaded holes 64.

Placed in one portion of the slot 61 is a contact strip 66, to which is suitably fastened a shaft 65 projecting through the bore 64a and threaded on its end. Placed in the other portion of the slot 61 is a contact strip 67 which is shorter than the contact plate 66 and is separated therefrom by a gap 65a.

A mica insulating washer 75 is placed on the top of the base 60 and is suitably secured thereto. The base 60 is fastened to the plate 4 by means of holding screws 74, held in the threaded holes 64—64 of the contact base and in corresponding clearance holes of the base.

Located in the top of the circular cavity 63 and extending within the slot 62 is a lugged contact ring 72, which is fastened to the base 60 by means of a screw 76 screwed in the contact strip 67 and projecting through the hole 78 of the mica washer 75 to form with its nuts 76a the terminal 13 of the heating wire 10.

A stud 77 screwed in the contact strip 66 and the base 60 and projecting through the hole 80 of the mica washer 75 forms with its nuts 77a the terminal 14 of the heating wire 10.

Placed within the annular bore 47 is a coiled spring 73 which makes a resilient electric contact between the contact ring 50 and the lugged contact ring 72. Also screwed against the contact ring 50a and held in position by the locking nuts 78 of the shaft 65 is the washer 70 and the spring washer 71, which form electric connection between the contact spring 50a and the shaft 65.

With both doors closed the gear 30 assumes a position whereby its two uppermost teeth engage the uppermost teeth 27 of the sectors 26 of both the front and rear doors. To open one of the doors, one or both knobs 35 are turned away from the door to be opened. For instance, to open the front door (see Fig. 1), the right-hand knob is turned clockwise and the left-hand knob counter-clockwise, whereupon the teeth 31 of the gear 30 engage successively the teeth 27 of the disc 26 of the front door which thus opens gradually. If the knob is released the spring 29 automatically returns the door to its closed position, whereby the gear 30 is returned to its normal position by the toothed sector 26.

In a similar way to open the rear door the knob or knobs 35 are turned away from this door, namely, the right-hand knob is turned counter-clockwise and the left-hand knob clockwise.

A common stop 38 fastened to the portion 6a of the sides 6 cooperates with annular slots 38a and 38b of the gear 30 to stop either door in the fully opened position.

While I have illustrated and described a construction in which a spring 29 automatically returns the opened door, this spring may be omitted and the door returned to its normal position by manual operation of the knob 35.

In the same way instead of providing two knobs 35, which operate either of the doors, a single knob may be used. Or it may be desirable to use two knobs each of which opens only one of the doors.

It should be noted that either door can be opened independently of the other by means of a single knob.

It should also be noted that the portion B can be revolved in any desired position and thereby the insertion of the slice or its removal made easy and convenient regardless of the location of the operator.

Due to the small and smooth contact surface between the plate 4 and the washer 3, rotation of the toaster is almost frictionless. The cooperation of the rim 4a with the recessed portion 1b of the plate 1 provides for additional support of the rotating part and at the same time prevents toast crumbs from entering in the space between the plates 1 and 4.

It should be also noted that continuity of the electric connection between the heating element 10 and the plug terminals 53 is maintained in all positions of the rotating part A through the following electric circuits:—

From one of the plug terminals 53 through the bent portion 52, extension 51 and circular portion 50 of the upper contact strip 39, coil spring 73, lugged ring 72, screw 76, terminal 13 to the lead 12, heating wire 10, lead 12a, terminal 14, contact strip 66, shaft 65, nut 78, washer 70 and spring washer 71, ring 50a, extension 51a and bent portion 52a of contact strip 39a and to the other plug terminal 53.

It should be further noted that with the special plug construction shown, the terminals 53—53 are protectedly located inside of the toaster base, instead of projecting outside thereof which is an objectionable feature found in present day toaster constructions.

It should be also noted that due to the shape of the bent portion 22 of the doors, the face of the toast is automatically reversed upon two successive openings of one door, whereby both sides of the slice can be toasted successively without its manual reversal.

Instead of using a metal base as has been the general practice in the construction of present day toasters and as has been also shown in the embodiment herebefore described, I have found it advantageous both for more convenient handling of the toaster, as well as to protect from radiated heat the piece of furniture upon which the toaster is placed or its cover, to use a base of heat insulating material. Such a base is shown in Figs. 15 to 22. This construction in addition to proposing the use of a base of heat insulating material for electric toasters which, so far as I know, is new in the art, also incorporates various novel details.

In this construction the base 90 is preferably a bakelite molding consisting of an outside ring 91 and an inside circular portion 92, the parts 91 and 92 being connected by three connecting spokes 93. The portions 91, 92 and 93 form three apertures 94 to reduce the weight and cost of the mold; however, if so desired, a solid circular plate may be used. The ring 91 is provided with a downward extending rim 95 having a circular recess 96 on the top. The ring 91 and the ends of the spokes 93 are preferably slightly depressed.

Opposite one of the spokes 93 a portion of the rim 95 is cut away to form an opening 100, around which is provided a pocket 101 the ends whereof form two feet 102—102. The pocket 101 is provided with two horizontal cylindrical holes 102a—102a.

The base 90 also carries two additional feet 103—103.

Under each spoke 93 there is provided a reinforcing rib of which the rib 105 connects the pocket 101, and the ribs 104—104 connect the feet 103—103 with the central portion 92.

The central portion 92 is provided with a downward extending hub 106 which has a rectangular extension 107 directed toward the pocket 101. On its bottom the hub 106 is provided with an annular recess 108 around which it forms a rim 109. An opening 110 is provided on the rim 109 which connects into a shallow horizontal slot 111 of the lower face of the rectangular extension 107, this slot connecting to a shallow vertical slot 112 provided in the outside face of said extension.

A horizontal threaded hole 113, going through the center of the vertical slot 112, is provided in the rectangular extension 107.

The upper face of the circular portion 92 is provided with an upward extending rim 115 and a shaft bearing 116, the two being separated by an annular portion 117, and the shaft bearing 116 preferably slightly projecting above the rim 115. The shaft bearing is provided with a metal bushing 118 and a bore 119.

A vertical slot 120 is provided in the portion 93, this slot also breaking away part of the rim 115 and extending downward about half way in the rectangular extension 107. The slot 120 connects with a vertical shallow slot 122 provided in the outside face of the extension 107. A horizontal threaded hole 121, going through the center of the vertical slot 122 is provided in the rectangular extension 107.

Placed in the annular recess 108 is a lugged connecting ring 125a, the lug 126a of which extends in the horizontal slot 111 whereby a bent end 127a of the lug is resting in the vertical slot 112. The bent portion 127 is provided with a perforation 128a corresponding to the hole 113.

Placed at the bottom of the annular recess 117 is a lugged ring 125 the lug 126 of which extends in the slot 120 whereby a bent end 127 thereof comes to lay in the vertical slot 122. The bent portion 127 is provided with a perforation 128 corresponding to the hole 121.

While the lugged contact rings 125 and 125a may be of different constructions and dimensions, I prefer to make them identical so that the same pieces may be used for both the upper and lower contact rings.

Two terminal rods 130 provided with reset and threaded ends 131 are screwed in the holes 113 and 121 respectively, so that their shoulders 132 press against the bent portions 127 and 127a of the contact rings 125 and 125a respectively. The free ends of the terminal rods 130 project through the holes 102a—102a of the pocket 101.

The parts not shown in Figs. 15 to 22 can be made identical with the parts illustrated and described in connection with the first embodiment of my invention, and have been omitted for the sake of clearness.

While I have illustrated my invention in connection with a specific construction of an electric toaster, I do not want to limit myself to the details or construction here shown, but the appended claims should be construed as broadly as possible in view of the prior art.

What I claim as new and desire to secure by Letters Patent is:—

1. In an electric toaster a toast-carrier frame and two side doors hingedly connected thereto, and a manually operated knob to open either of the side doors independently of the other.

2. In an electric toaster a toast-carrier frame comprising sides and doors, said doors being hingedly attached to the sides and a common operating member to cause upon manual actuation the gradual and independent opening of either door.

3. In an electric toaster a toast-carrier frame and a gear connected thereto, two doors swingingly attached to said frame, each door being provided with a toothed member, a common knob to operate the gear of the frame to engage it with the toothed member of either door and thereby cause the opening of said door independently of the other door.

4. In an electric toaster a toast-carrier frame having two side doors opposite to each other, a common operating member to open either of the side doors independently of the other and means to automatically close said doors.

5. In an electric toaster a toast-carrier frame having two sides and oppositely located doors hingedly connected thereto and means fixedly connected to each side for the independent opening of the doors by the manual operation of a single knob.

6. In an electric toaster in combination a fixed circular base provided with an annular recess, a rotatable toast-carrier frame having a circular supporting plate provided with a rim, said carrier frame adapted to assume any angular position relative to the base whereby it is supported in its rotation through cooperation of said rim with the recess of the base.

FRANK J. SPRAGUE.